(12) United States Patent
Ruiz et al.

(10) Patent No.: US 8,667,461 B2
(45) Date of Patent: Mar. 4, 2014

(54) WORKFLOWS OR PROCESSES WITH DYNAMIC REFERENCE ACTIVITY

(75) Inventors: Gonzalo Ruiz, Montreal (CA); Nirav Shah, Bothell, WA (US); Steven Kaplan, Hyderabad (IN); Mesganaw Anteneh, Lynwood, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 13/096,566

(22) Filed: Apr. 28, 2011

(65) Prior Publication Data
US 2012/0278786 A1 Nov. 1, 2012

(51) Int. Cl.
*G06F 9/45* (2006.01)

(52) U.S. Cl.
USPC .......................................................... 717/106

(58) Field of Classification Search
USPC .......................................................... 717/102
See application file for complete search history.

(56) References Cited

U.S. PATENT DOCUMENTS

| 6,052,684 | A | 4/2000 | Du |
| 7,631,291 | B2 | 12/2009 | Shukla et al. |
| 2002/0055849 | A1* | 5/2002 | Georgakopoulos et al. ...... 705/1 |
| 2003/0233374 | A1 | 12/2003 | Spinola et al. |
| 2007/0011334 | A1* | 1/2007 | Higgins et al. ................ 709/227 |
| 2010/0241990 | A1 | 9/2010 | Gabriel et al. |
| 2010/0251155 | A1 | 9/2010 | Shah et al. |

OTHER PUBLICATIONS

Goldszmidt, et al., "On demand business process life cycle, Part 6: Apply customization policies and rules", Retrieved at <<http://www.ibm.com/developerworks/webservices/library/ws-odbp6/index.html>>, Feb. 5, 2005, pp. 10.
Milner, Matt, "A Developer's Introduction to Windows Workflow Foundation (WF) in .NET 4", Retrieved at <<http://msdn.microsoft.com/en-us/library/ee342461.aspx>>, Nov. 2009, pp. 50.
"Windows Workflow Foundation", Retrieved at <<http://tripous-net.com/CSharp_WWF.html >>, Retrieved Date: Feb. 4, 2011, pp. 27.
Esposito, Dino, "Getting Started with Microsoft Windows Workflow Foundation: A Developer Walkthrough", Retrieved at <<http://msdn.microsoft.com/en-us/library/aa480214.aspx>>, Feb. 2006, pp. 27.

* cited by examiner

*Primary Examiner* — John Chavis
(74) *Attorney, Agent, or Firm* — Brian Haslam; Damon Rieth; Micky Minhas

(57) ABSTRACT

A placeholder activity is employed in a workflow or process definition, which may be loaded in a workflow design application even if the type of activity referred by the placeholder activity cannot be loaded. The "reference activity" enables a workflow or a process to bind to an actual activity type at runtime such that the workflow or process can dynamically use a latest version of the activity without a need to modify the workflow/process definition.

20 Claims, 6 Drawing Sheets

WORKFLOWS OR PROCESSES WITH DYNAMIC REFERENCE ACTIVITY

BACKGROUND

A workflow includes a sequence of connected steps. It is a depiction of a sequence of operations, declared as work of a person, a group of persons, an organization of staff, or one or more simple or complex mechanisms. For control purposes, workflow may be a view on performed work under a particular aspect, thereby serving as a virtual representation of the performed work. The flow being described may often refer to a document that is being transferred from one step to another. In software engineering, workflow refers to detailed code specifications for running and coordinating a sequence of events. It can be a simple, linear sequence—the classic flow chart, for example—or a conditional, many-branched series of events linked together and interacting within complex feedback loops.

A workflow space in which a workflow definition is composed of multiple activities presents a number of challenges. When a single activity type cannot be loaded, it may not be possible to load the entire workflow. Thus, workflow designers may not be able to edit or open the workflow object graph and to correct the problem. In order to replace one of the activities which form the workflow, it may be necessary to modify the workflow definition, which is impractical as there might be a large number of workflows that make use of that activity and each workflow may have to be modified individually. Furthermore, persisted workflow instances that make use of a recently modified or new activity may not automatically use the new version of the activity when they resume. This may become a significant challenge because workflows are often long-running processes, and old workflows that are still executing may keep making use of an old version of the activities. If a workflow is to be edited in a workflow design application, which loads the activity types, the developer may be required to have the assemblies containing all the activities present in the workflow. This may force workflow applications to release all activities which take part in workflows at once restricting the possibility of private workflow activities.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing a placeholder activity in a workflow or process definition that may be loaded in a workflow design application even if the type of activity referenced by the placeholder activity cannot be loaded. A workflow or process according to some embodiments enables binding to an actual activity type at runtime such that the workflow or process can dynamically use a latest version of the activity without a need to modify the workflow/process definition.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
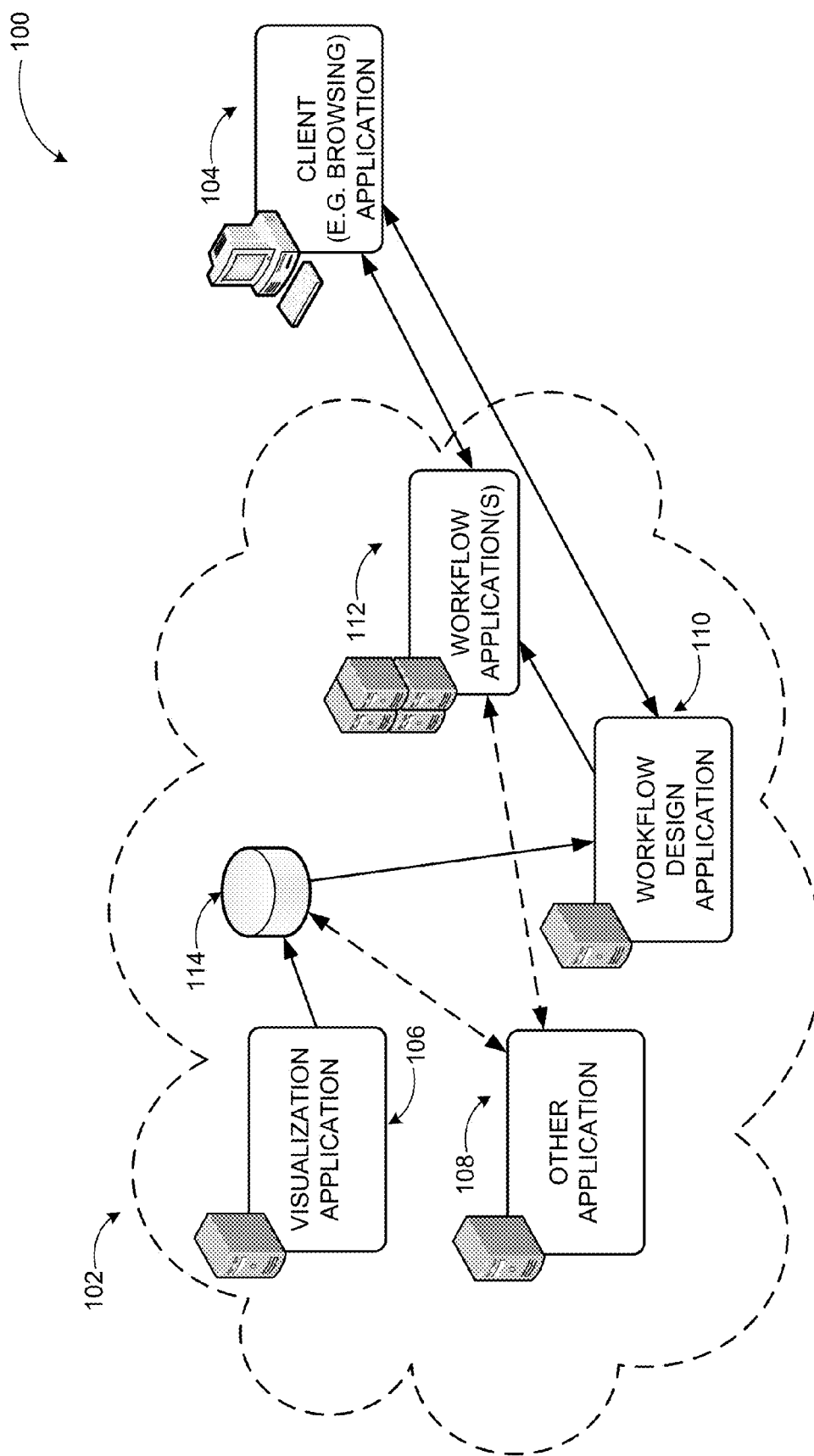
FIG. 1 illustrates an example system where a workflow or process with a dynamic reference activity according to embodiments may be implemented.

As briefly described above, a placeholder activity may be used in a workflow or process definition to be loaded in a workflow design application even if the type of activity referred by the placeholder activity cannot be loaded. Such a reference activity may be enabled to bind to an actual activity type at runtime such that the workflow or process can dynamically use a latest version of the activity without a need to modify the workflow/process definition. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web based applications executing workflows, workflow design applications, and similar ones. Examples of platforms include, but are not limited to, a hosted service executed over a plurality of servers, an application executed on a single server, and comparable systems. The term "server" generally refers to a computing device executing one or more software programs typically in a networked environment.

FIG. 1 illustrates an example system where a workflow or process with a dynamic reference activity according to embodiments may be implemented. A system executing a workflow or process with dynamic reference activity according to embodiments may be implemented in a variety of configurations and environments. The example environment shown in diagram 100 is a hosted service environment, where distinct servers may be utilized to execute applications for performing individual tasks. The tasks may be performed in a combined manner by fewer or additional applications and/or servers according to other embodiments.

Diagram 100 includes the hosted workflow service provided by a plurality of servers (or clusters), which execute a visualization application 106, one or more workflow applications 112, a workflow design application 110, and other application(s) 108. The servers and data store 114 for maintaining data related to the workflow and associated operations may communicate over one or more networks 102. Access to the workflow application(s) 112 or any of the other applications may be provided through a client application 104 (e.g., a browsing application) at a client device.

Workflow application(s) 112 may enable users to define, execute, and keep track of a number of sequential and/or parallel activities in any process. Visualization application 106 may provide graphical and/or textual renderings of a portion or the entire workflow being executed. Workflow design application 110 may enable users to define and modify workflows at activity level. Other application(s) 108 may be any application that performs tasks associated with the workflow activities. For example, in a Customer Relationship Management (CRM) system, inventory or accounting applications may provide data for various activities in a workflow or at least partially execute some of the activities and report results to the workflow application(s) 112. Client application 104 may be a rich client application installed on the client device providing secure connection to the workflow service. Client application 104 may also be a thin client application such as a browser that enables a user to log in to the workflow service and provide appropriate user interfaces for the user to interact with the service.

As discussed above, failure to load a single activity type may affect loading of the entire workflow. In cases of multiple workflows sharing an activity, replacing the shared activity may necessitate modification of the workflow definition, which may be impractical if a large number of workflows make use of that activity. Furthermore, if a workflow is to be edited in workflow design application 110, which loads the activity types, the developer may be required to have the assemblies containing all the activities present in the workflow. This may force workflow applications to release all activities which take part in workflows at once restricting the possibility of private workflow activities. Moreover, some activities may require to be wrapped in an interoperability activity. Because of this requirement, replacing an activity in a workflow definition may require more than just replacing the activity type. An interaction to wrap the activity in an interoperability activity may be necessary if the activity is of the above described type. This may also require modifications to the workflow definition for all workflows making use of that activity.

A workflow service according to embodiments enables the use of a placeholder activity in a workflow or process definition that may be loaded in a workflow design application even if the type of activity referred by the placeholder activity cannot be loaded. The placeholder activity may be bound to an actual activity type at runtime such that the workflow or process can dynamically use a latest version of the activity without a need to modify the workflow/process definition.

Workflows are processes that need to be followed in order to comply with some defined business rules or logic and are defined as a flow among multiple steps (activities). A business process defined in such a way can abstract away the actual details of the work that happens inside a specific step. The placeholder activity may act as an acknowledgement that the workflow contains a step whose details are likely to change and are stored separately. When the workflow reaches a placeholder, the placeholder may dynamically find the latest version defined for the details pertaining to that step, without requiring any modification to the workflow as a whole. In conventional systems, when the internal implementation of a step needs to be updated, a new step may need to be defined and then all workflow definitions may need to be modified to include the new version of the step and remove the old version.

Once a workflow begins, its steps are typically initialized. If the workflow is aware of the execution details for its steps, then the logic for a particular step may also be initialized at that moment and cached until the workflow reaches that step. At that point, the workflow application may use the logic that was initialized. However, between the time the workflow starts and the time it executes the step in question, the step logic may be changed (e.g., new company policy). A workflow system according to embodiments enables delayed initialization of the step logic until the workflow reaches that step (if it reaches it at all). At the moment that a workflow reaches the placeholder activity, the latest definition of that logic may be retrieved, initialized, and executed. If the same step is reached again, the placeholder may again ensure the use of the latest definition of the step referred to by the placeholder. Updating the logic of one step may thereby immediately apply to all instances of workflows that are being executed. This flexibility is not possible in workflow systems that cache activities at workflow initialization unless the cache is cleared, which typically requires manual intervention (e.g., restart process/machine or explicit cache flush).

In the event of one of the activities of the workflow not being able to be loaded (i.e., is deleted, inaccessible, etc.), the workflow may still be able to load without any gaps. There may be references to activities which no longer exist but these may be removed or corrected by editing the workflow definition. Because the actual implementation of the activity is not declared in the workflow, the workflow may be modified from a higher level in which the details are abstracted away.

Figure 2:
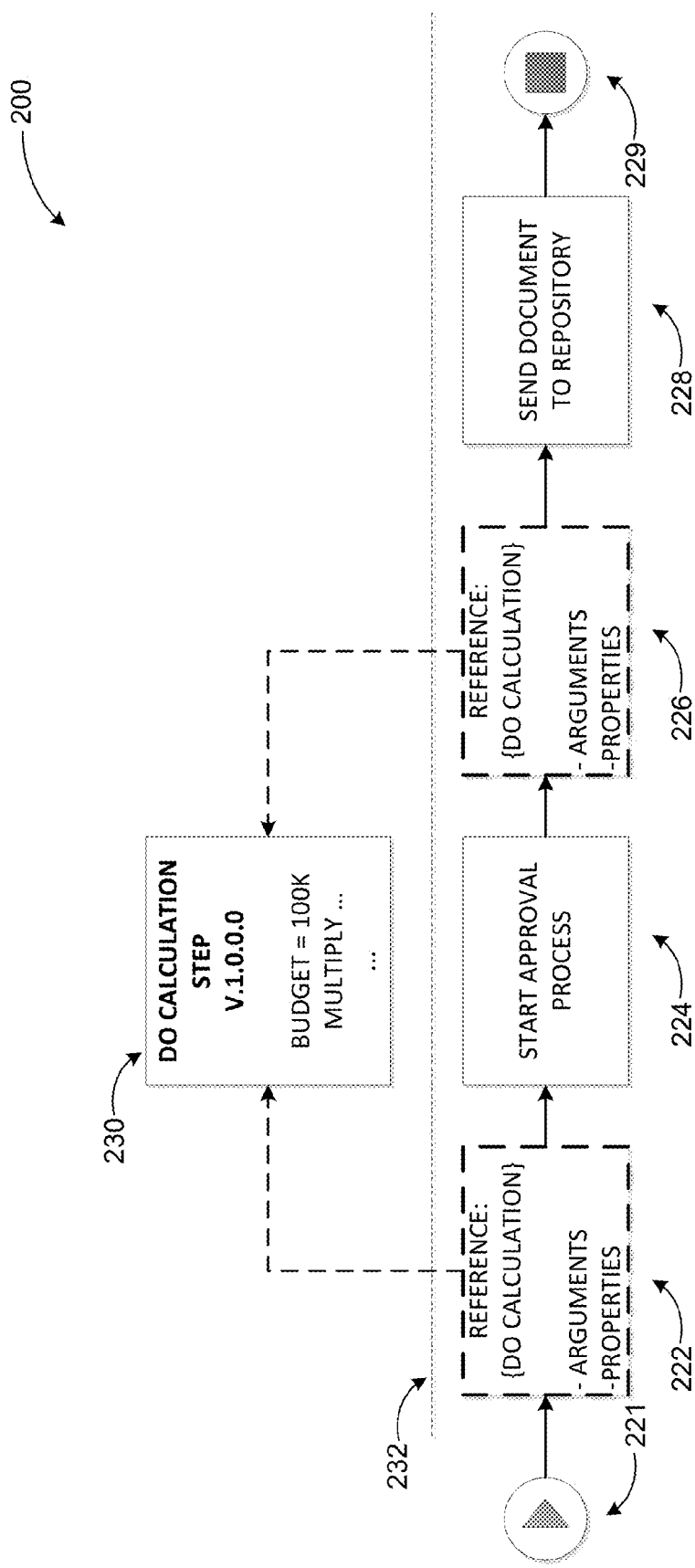
FIG. 2 illustrates the definitions of an example process employing a dynamic reference activity according to some embodiments.

FIG. 2 illustrates the definitions of an example process employing a dynamic reference activity according to some embodiments. A reference activity according to embodiments may be any activity as part of a workflow or process. A workflow or process implementing a dynamic reference activity may also be associated with a wide range of areas such as customer relationship management, enterprise resource planning, software design, production, and comparable ones. Diagram 200 displays an example workflow simplified for illustration purposes.

A reference activity 222 is inserted into the workflow illustrated in diagram 200 right after its start 221. Reference activity 222 refers to referred activity 230 ("Do Calculation"), which may be associated with computation of a budget, for example. Reference activity 222 may include arguments and properties that are used by the referred activity 230. Following reference activity 222, a "Start Approval Process" activity 224 may be performed by the workflow, which may be followed by a second reference activity 226 referring to the same referred activity 230. Second reference activity 226 may be followed by activity 228 "Send Document To Repository" before the workflow ends (229). As discussed previously, referred activity 230 "Do Calculation" may not even be defined at the time the workflow is initialized, modified after the workflow begins, etc. This is conceptually illustrated in the diagram with the separation line 232. As shown in the diagram, referred activity 230 includes a version number. This indicates that the referred activity may be modified to a newer version and that newest version may be executed by the workflow since the workflow does not cache the referred activity 230, but becomes aware of it when the reference activities (222 and 226) are executed.

The reference activities 222 and 226 are indeed actual workflow activities, which are in charge of finding an activity defined somewhere else and executing it. As such, reference activities 222 and 226 may include, for example, following fields: Name—the full name to identify the referred activity for the execution logic to be redirected to; Properties—if the referred activity needs to be configured, this field may store the configuration properties for that activity; and Arguments—if the referred activity has input or output arguments, the arguments may be configured using this field.

As indicated above, the reference activity does not store the actual type that is referenced. Instead, the reference activity stores an identifier (Name). That way, the reference activity can always be loaded regardless of the existence or validity of the referenced activity (referred activity 230) making it possible to load the entire workflow in a design application. Once the workflow is loaded to a design application, the reference activity may validate whether the reference is valid and provide the user with a specific error message in case the referred activity cannot be loaded. The referencing capability opens the possibility to support editing workflow definitions in a design application, without having to release some of the activities that the workflow definition references. Such references can then be part of private assemblies.

When the reference activity is loaded (either at design time or at runtime), it may employ a flexible strategy for finding/loading the activity that is referenced and may use an extension in the context to do so. The context extension is an interface to find the referred activity and its implementation may be defined by the workflow host. Thus, the same reference activity may use multiple loading strategies depending on whose implementation the host adds to the execution context. For example, the referred activity may be physically found on disk, in the global assembly cache, or in a database. However, the reference activity has no knowledge of this since the interface to find the referred activity is defined by the host.

Once the referred activity is found, the reference activity may then proceed to configure it by mapping the input and output parameters as well as setting the properties of the referred activity instance. The redirection of arguments and properties may be hidden to the rest of the workflow, which may perceive the entire execution as if the reference activity was indeed the activity that is referenced.

Figure 3:
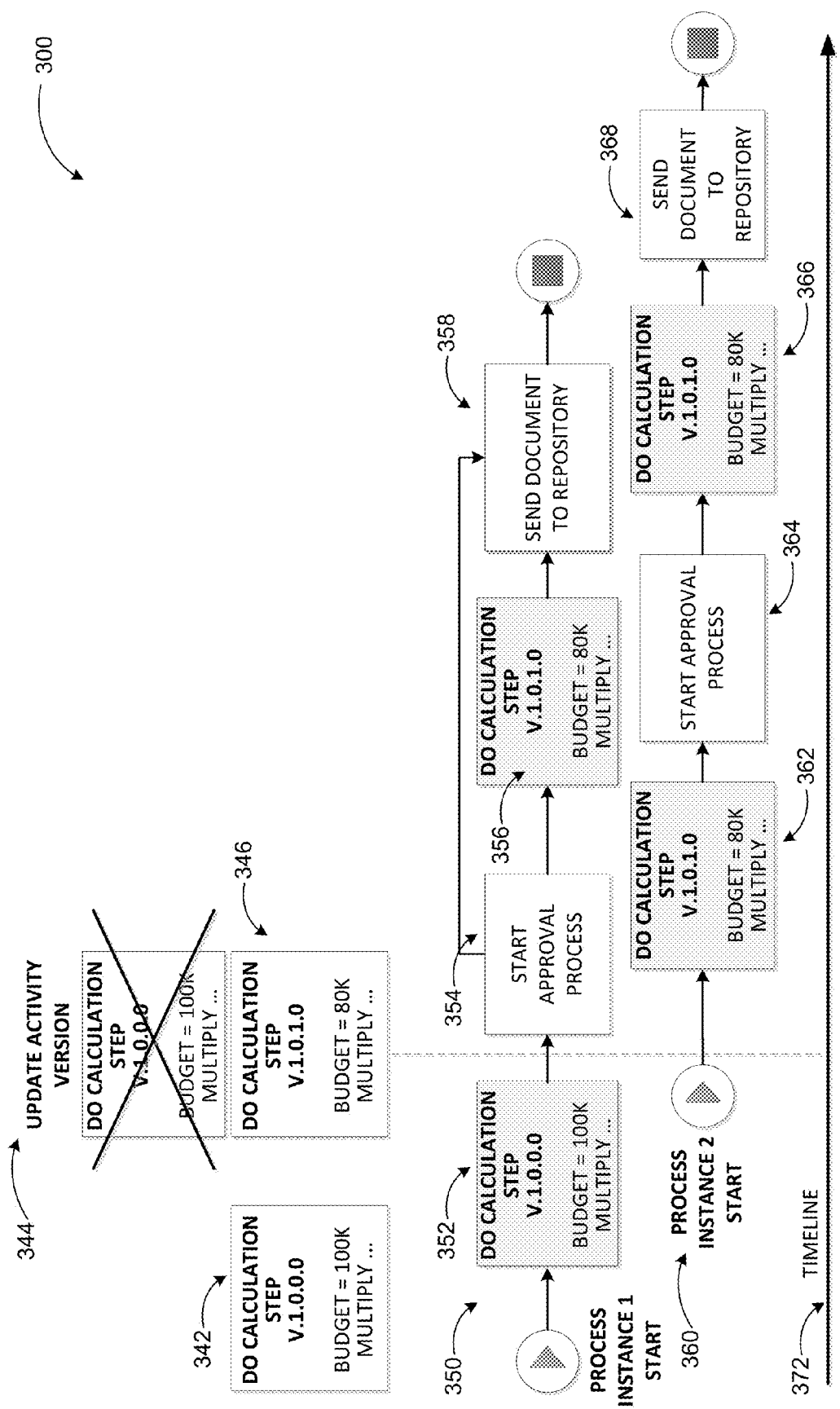
FIG. 3 illustrates an example process employing a dynamic reference activity according to some embodiments at runtime.

FIG. 3 illustrates an example process employing a dynamic reference activity according to some embodiments at runtime. Diagram 300 displays two example scenarios of using a reference activity in a workflow execution.

According to the first example scenario ("process instance 1" 350), the workflow begins with a reference activity 352, which binds to referred activity 342. As shown against timeline 372, the referred activity 342 is updated (344) after the execution of reference activity 352 resulting in the new version of referred activity 346. Because the modification takes place after the execution of the reference activity 352, the old version of the referred activity 342 is executed within this first workflow. Next is a regular activity 354 "Start Approval Process" followed by another instance of the reference activity 356. When the new instance of the reference activity 356 is executed, the referred activity is already modified. Thus, the new version of the referred activity 346 is executed in this case although both reference activities (352 and 356) may look the same. The new instance of the reference activity 356 is followed by activity 258 "Send Document To Repository."

The second example scenario follows the same workflow ("process instance 2" 360) with the difference that the first activity of the workflow, reference activity 362 is executed after the update to the referred activity (344). Thus, the first instance of the reference activity 362 causes the new version of the referred activity 346 to be executed followed by activity 364 "Start Approval Process", the second instance of the reference activity 366, and activity 368 "Send Document To Repository." Both instances of the reference activity call the new version of the referred activity 346 without the workflow definition having to be changed.

Thus, there are three major aspects of a workflow/process service according to embodiments: use of placeholder activity, delayed initialization and declaration of execution logic in a workflow step, and support for loading workflows even when some of the steps (activities) cannot be loaded. After initialization and configuration of an activity, the workflow begins execution and when it reaches the reference activity, which has already been loaded and configured, the reference activity waits for the referred activity to finish execution and then completes passing all the output arguments back to the caller.

At any given moment, the workflow may go idle, for example, if it is waiting on some event to occur. At that point, all the loaded references from any reference activity may be removed from the cache and not stored as part of the persisted state of the workflow. When the workflow resumes, the reference activity instances may use again the strategy in the context extension to find the referred activities. At that point, the referred activity may have changed because: (1) the strategy definition may be different and the host may have changed the behavior for finding the referred activity; or (2) the referred activity may have changed or no longer exist.

Because the metadata cache for the referred activities is re-populated, the system may guarantee that the referred activities as defined by the most recent strategy or policy are loaded and executed. Thus, the "process instance 1" 350 finds a different referred activity for the second instance of the reference activity based on a different strategy. No change is required to the workflow definition or workflow instance. There is also no need for any updates to the workflow host.

As discussed above, the strategy for finding the referred activity may be flexible and independent from the reference activity implementation. In some embodiments, the strategy may be defined to retrieve an activity whose type name, assembly name, public key token, culture, major version, and/or minor version matches. These may be loaded from a database, from disk, or from global assembly cache. In case of finding multiple activities that meet the criteria, one with the latest build and revision version may be selected. Therefore, when a new build of an activity is registered in the system, all reference activities may not point to the one from the latest build. This enables an effective and reliable process for updating activities in workflows.

The different processes discussed in FIG. 1 through 3 may be performed at distinct hardware modules, software modules, or combinations of hardware and software. Furthermore, such modules may perform two or more of the processes in an integrated manner using the principles described herein.

Figure 4:
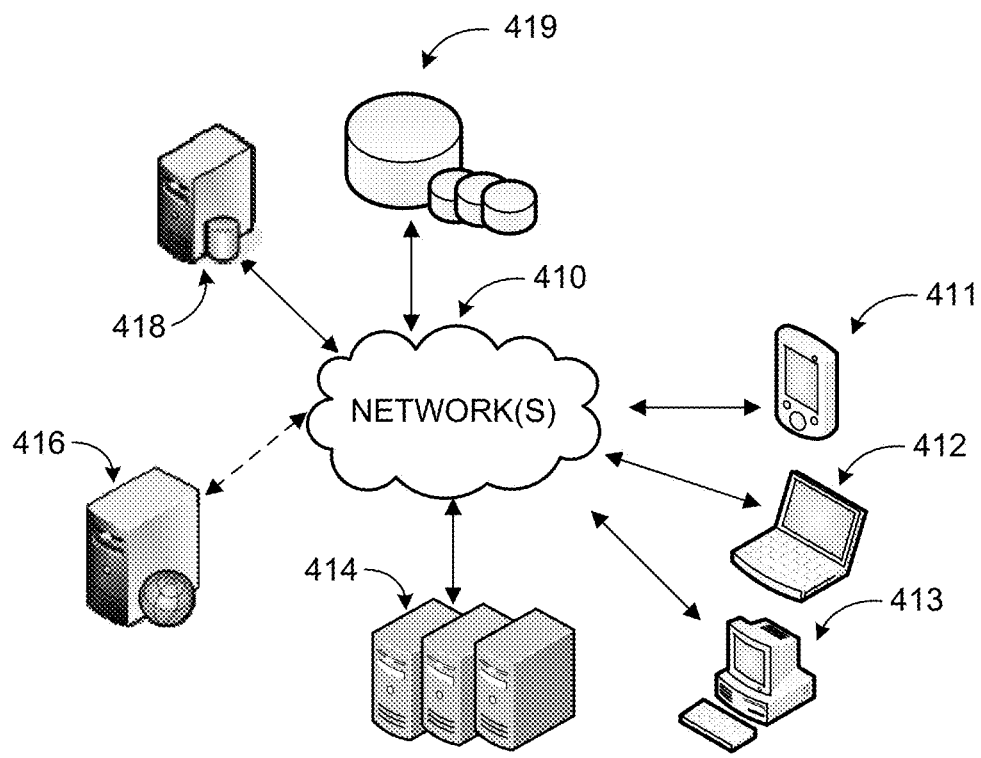
FIG. 4 is a networked environment, where a system according to embodiments may be implemented.

FIG. 4 is an example networked environment, where embodiments may be implemented. A platform for providing a workflow or process with dynamic reference activity may be implemented via software executed over one or more servers 414 such as a hosted service. The platform may communicate with client applications on individual client devices such as a smart phone 411, laptop 412, desktop computer 413, or similar devices ('client devices') through network(s) 410.

Client applications executed on any of the client devices 411-413 may interact with a hosted service providing workflow services from the servers 414, or on individual server 416. The hosted service may execute the workflow or process with a placeholder activity in the workflow or process definition that may be loaded in a workflow design application (e.g., executed on server 416) even if the type of activity referred by the placeholder activity cannot be loaded. The placeholder activity may be enabled to bind to an actual activity type at runtime such that the workflow or process can dynamically use a latest version of the activity without a need to modify the workflow/process definition. Relevant data such as workflow data and similar information may be stored and/or retrieved at/from data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also include (especially between the servers and the mobile devices) cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing workflow definition and execution with reference activities. Furthermore, the networked environments discussed in FIG. 4 are for illustration purposes only. Embodiments are not limited to the example applications, modules, or processes.

Figure 5:
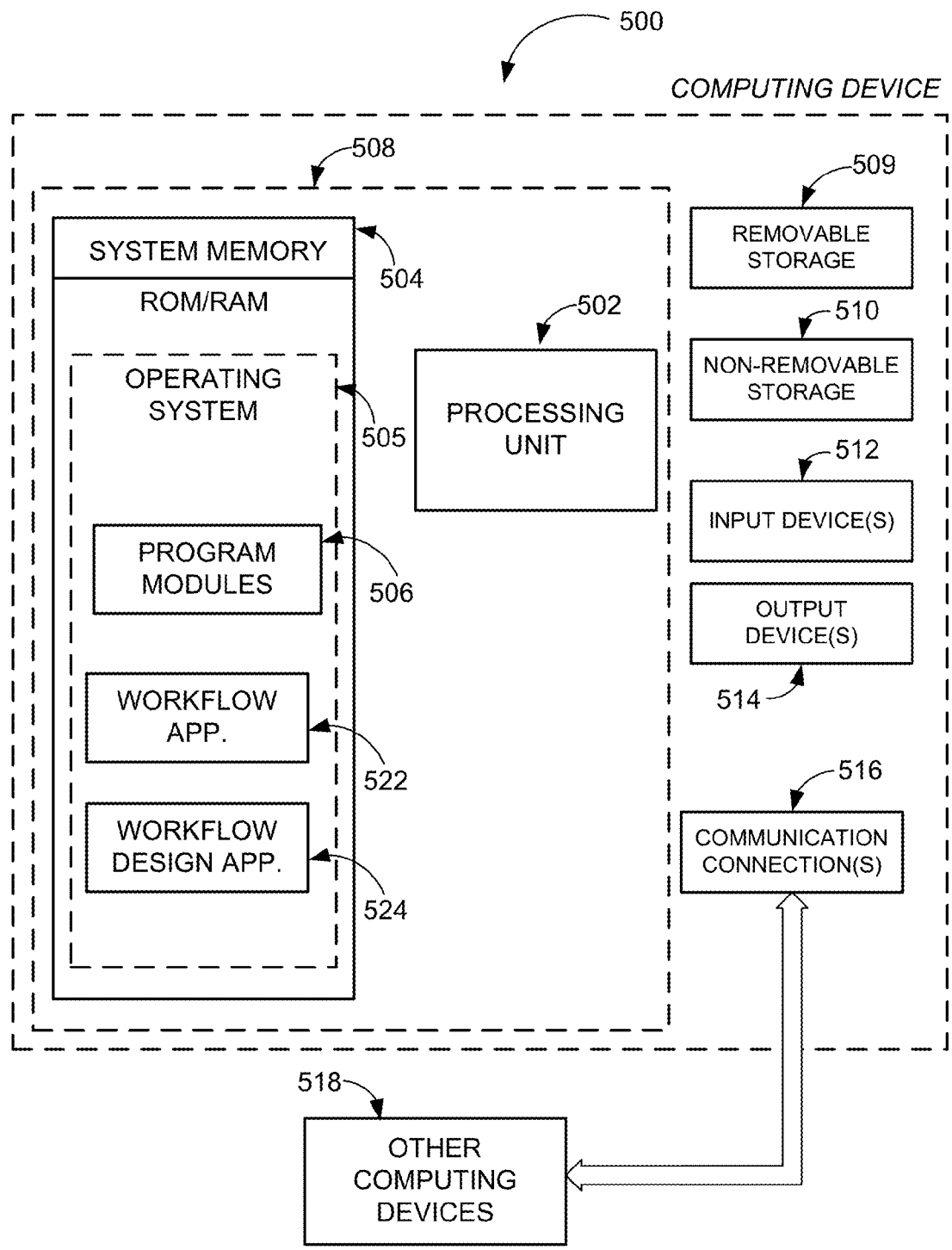
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server capable of providing workflow services according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. or similar ones. The system memory 504 may also include one or more software applications such as program modules 506, workflow application 522, and workflow design application 526.

Workflow application 522 and workflow design application 526 may in practice be executed on separate servers, client devices, or other components of a distributed system. Workflow application 522 may execute workflows, collect information associated with the execution, provide execution state data, and the like. Workflow design application 524 may enable designers to include a placeholder activity in a workflow or process definition even if a type of activity referenced by the placeholder activity cannot be loaded. The placeholder activity may be enabled to bind to an actual activity type at runtime such that the workflow or process executed by the workflow application 522 can dynamically use a latest version of the activity without a need to modify the workflow/process definition as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
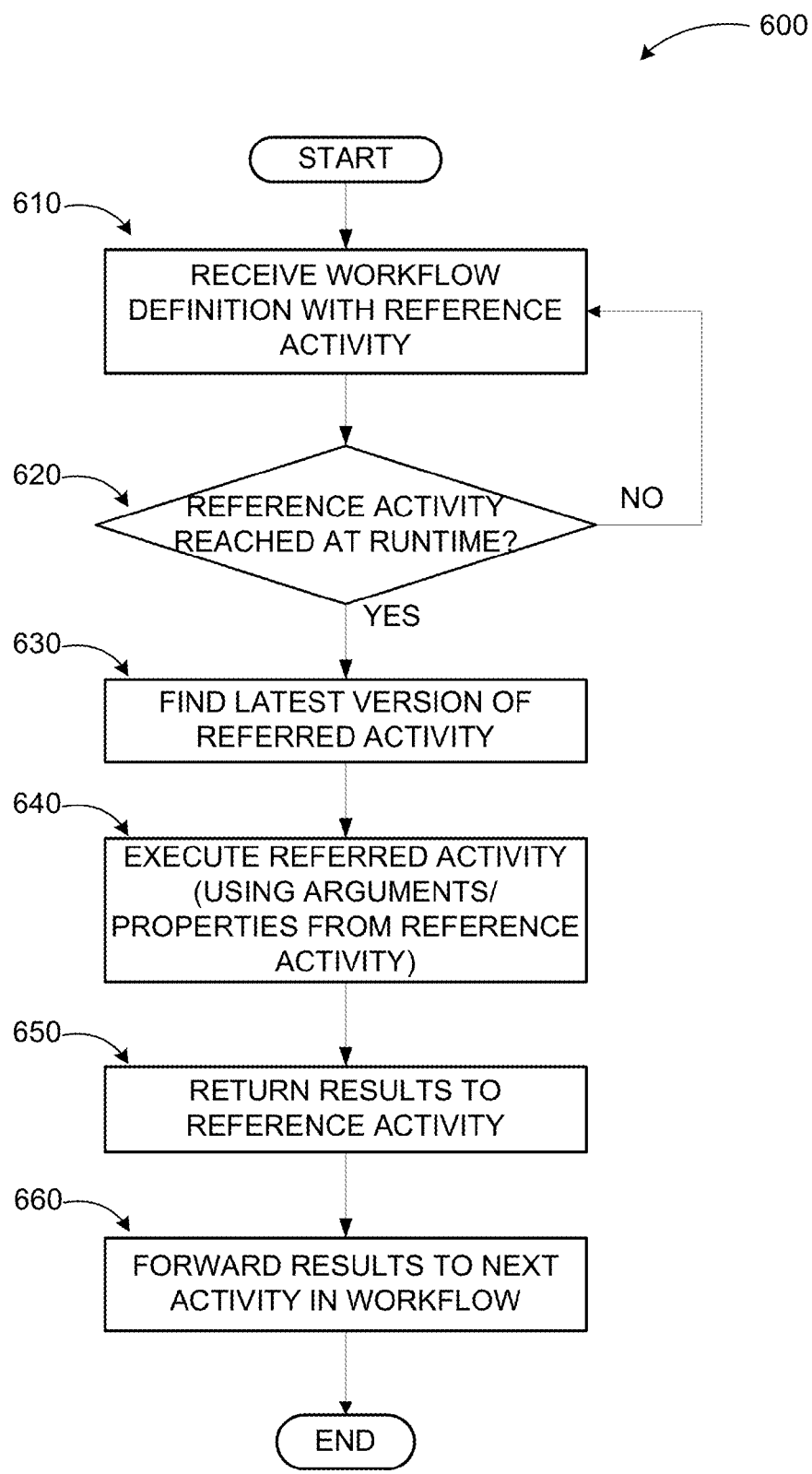
FIG. 6 illustrates a logic flow diagram for a process of employing a dynamic reference activity in a workflow or process according to embodiments.

FIG. 6 illustrates a logic flow diagram for process 600 of employing a dynamic reference activity in a workflow or process according to embodiments. Process 600 may be implemented as part of a hosted workflow service.

Process 600 begins with operation 610, where workflow definition is received at the system (e.g., from a workflow design application) that includes at least one reference activity. When a reference activity is reached at decision operation 620, a latest version of the referred activity is found at operation 630. This latest version of the referred activity is executed at operation 640 using the arguments and properties of the reference activity. The results of the execution of the referred activity are returned to the reference activity at operation 650, which in turn forward the results to the next activity in the workflow at operation 660.

The operations included in process 600 are for illustration purposes. Providing a dynamic reference activity in a workflow or process may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing a workflow with a dynamic reference activity, the method comprising:
receiving a workflow definition that includes at least one reference activity;
when the reference activity is reached at runtime, determining a referred activity associated with the referenced activity;
providing an error message associated with the referred activity in response to an inability to retrieve the referred activity while validating the referred activity;
retrieving and initializing the referred activity;
executing the referred activity at least partially based on an argument and a property of the reference activity;
returning a result of the referred activity execution to the reference activity; and
forwarding the result from the reference activity to a subsequent activity in the workflow.

2. The method of claim 1, further comprising:
loading the reference activity regardless of one of an existence and a validity of the referred activity.

3. The method of claim 1, further comprising:
upon determining the referred activity, configuring the referred activity by mapping an input and an output parameter of the reference activity to the referred activity.

4. The method of claim 3, further comprising:
setting at least one property of the referred activity instance based on a property of the reference activity.

5. The method of claim 1, further comprising:
redirecting at least one argument and at least one property of the reference activity to the referred activity in a hidden manner to a remainder of the workflow.

6. The method of claim 1, wherein in response to the workflow stopping, loaded references from reference activities are removed from cache and not stored as part of a persisted state of the workflow.

7. The method of claim 6, further comprising:
upon resumption of the workflow, employing a strategy defined by a context extension to determine referred activities identified by reference activity instances.

8. The method of claim 7, wherein the context extension is an interface defined by the workflow host for at least one of finding and loading the referred activities.

9. The method of claim 7, wherein the strategy for finding a referred activity is independent from an implementation of a reference activity binding to the referred activity.

10. The method of claim 7, wherein the strategy for finding a referred activity is defined to retrieve an activity with a matching one of at least one from a set of: a type name, an assembly name, a public key token, a culture, a major version, and a minor version to the reference activity.

11. The method of claim 10, further comprising:
in response to determining a plurality of activities that meet the strategy, selecting an activity with a latest build and revision version.

12. A system for providing a workflow service with dynamic reference activity, the system comprising:
a first server hosting a workflow design application, the workflow design application configured to:
enable loading of a reference activity in a workflow definition regardless of availability of a type of an activity referred to by the reference activity; and
a second server hosting a workflow application, the workflow application configured to:
receive the workflow definition from the workflow design application;
delay an initialization associated with the referred activity until reaching the reference activity;
when the reference activity is reached at runtime, determine a latest version of the referred activity associated with the referenced activity;
retrieve and initialize the referred activity;
execute the referred activity at least partially based on an argument and a property of the reference activity;
return a result of the referred activity execution to the reference activity; and
forward the result from the reference activity to a subsequent activity in the workflow.

13. The system of claim 12, wherein the workflow application is further configured to:
determine the referred activity employing a strategy defined by a context extension interface that is independent of the reference activity.

14. The system of claim 13, wherein the workflow application enables use of multiple loading strategies for the same reference activity based on a configuration of the context extension interface.

15. The system of claim 12, wherein the referred activity is retrieved from one of:

a disk, a global assembly cache, and a database.

16. The system of claim 12, wherein the workflow design application is further configured to enable correction of references to non-existing activities by editing the workflow definition.

17. The system of claim 12, wherein the workflow service is associated with one of a customer relationship management (CRM) service, an enterprise resource planning (ERP) service, and a software design service.

18. A computer-readable memory device with instructions stored thereon for providing a workflow service with dynamic reference activity, the instructions comprising:

enabling loading of a reference activity in a workflow definition regardless of availability of a type of an activity referred to by the reference activity;

delaying an initialization associated with a referred activity associated with the reference activity until reaching the reference activity;

when the reference activity is reached at runtime, determining the referred activity associated with the referenced activity employing a strategy defined by a context extension interface that is independent of the reference activity;

providing an error message associated with the referred activity in response to an inability to retrieve the referred activity while validating the referred activity;

retrieving and initializing the referred activity;

executing the referred activity at least partially based on an argument and a property of the reference activity;

returning a result of the referred activity execution to the reference activity; and forwarding the result from the reference activity to a subsequent activity in the workflow.

19. The computer-readable memory device of claim 18, wherein the instructions further comprise:

enabling editing of workflow definitions in a workflow design application without having to release at least a portion of the activities referenced by the workflow definition, wherein the unreleased activities are part of a private assembly.

20. The computer-readable memory device of claim 18, wherein the reference activity includes at least one from a set of: a name field for identifying the referred activity, a property field for configuring the referred activity, and an argument field for storing input and output arguments for the referred activity.

* * * * *